(12) United States Patent
Palmer

(10) Patent No.: US 6,746,056 B2
(45) Date of Patent: *Jun. 8, 2004

(54) FLUID COUPLING DEVICE

(75) Inventor: Robert Palmer, Hopatcong, NJ (US)

(73) Assignee: Strahman Valves, Inc., Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/408,361

(22) Filed: Apr. 7, 2003

(65) Prior Publication Data

US 2003/0189337 A1 Oct. 9, 2003

Related U.S. Application Data

(63) Continuation of application No. 09/718,273, filed on Nov. 22, 2000.

(51) Int. Cl.[7] ............................................... F16L 27/04
(52) U.S. Cl. ........................ 285/261; 285/271; 285/351
(58) Field of Search ............................. 285/146.1, 261, 285/270, 271, 266, 351

(56) References Cited

U.S. PATENT DOCUMENTS

| | | |
|---|---|---|
| 20,488 A | 8/1858 | Zinkil |
| 1,087,006 A | 2/1914 | Fitzsimons |
| 2,557,106 A | 6/1951 | Hughes |
| 2,971,701 A | 2/1961 | Shames et al. |
| 3,022,014 A | 2/1962 | Young |
| 3,224,793 A | 12/1965 | Benjamin |
| 3,334,818 A | 8/1967 | Moen |
| 3,454,288 A | * 7/1969 | Mancusi, Jr. ............... 285/261 |
| 3,921,912 A | 11/1975 | Hayes |
| 4,035,004 A | 7/1977 | Hengesbach |
| 4,596,362 A | 6/1986 | Pralle et al. |
| 4,776,615 A | * 10/1988 | Young .......................... 285/261 |
| 5,697,534 A | 12/1997 | Huyghe |
| 5,730,370 A | 3/1998 | Bowen |
| 6,027,041 A | 2/2000 | Evans |

FOREIGN PATENT DOCUMENTS

| | | |
|---|---|---|
| CH | 169623 | 9/1934 |
| DE | 3629696 A1 | 3/1988 |
| IT | 445789 | 9/1947 |

* cited by examiner

*Primary Examiner*—David Bochna
(74) *Attorney, Agent, or Firm*—Carella, Byrne, Bain, Gilfillan, Cecchi et al.; John G. Gilfillan, III; William Squire

(57) ABSTRACT

A fluid coupling device employs a male spherical member with a fluid receiving bore and a female housing. The spherical member abuts two axially spaced Teflon ring seats between the member and the housing in the housing chamber. The ring seats reduce friction between the member and the housing and axially retain the member in the housing with no metal to metal contact. A first O-ring provides fluid sealing between the spherical member and housing inner wall in the chamber. A hose receiving nipple member with a fluid receiving bore has a threaded concave end with a peripheral region that engages the first O-ring to hold the O-ring against the spherical member, one of the ring seats and housing chamber wall to seal the interface between the spherical member and housing. The nipple member has a flange which abuts the housing to limit squeezing action on the O-ring to ensure sufficient contact of the O-ring and mating surfaces to obtain a good seal without creating excessive friction loads. A second O-ring seals the interface between the flange and housing.

10 Claims, 1 Drawing Sheet

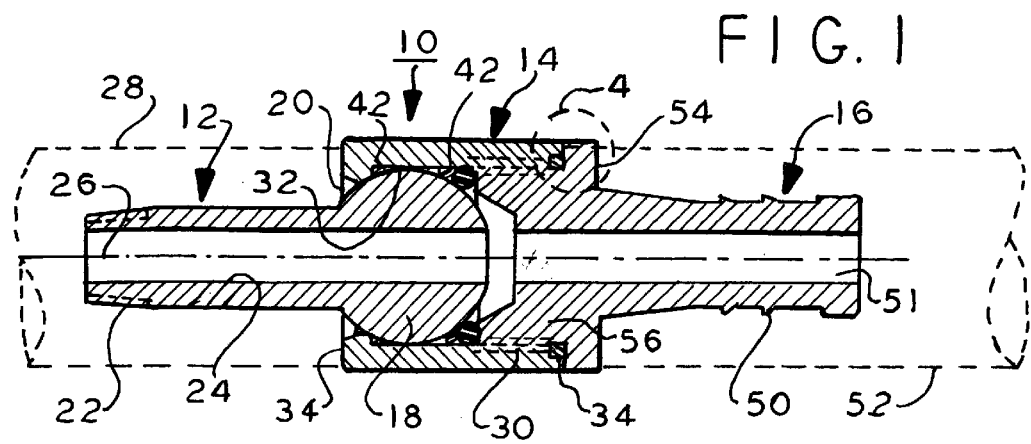
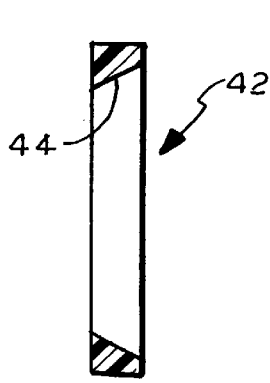
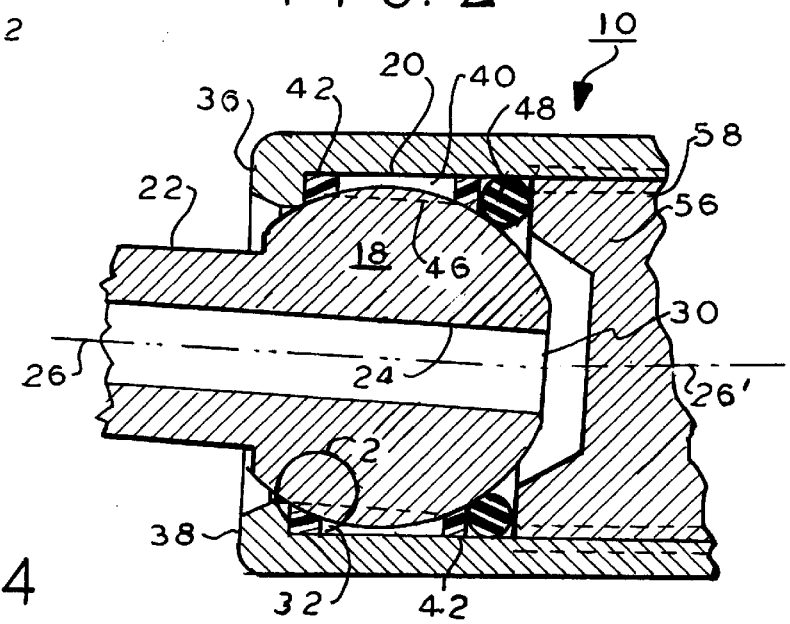
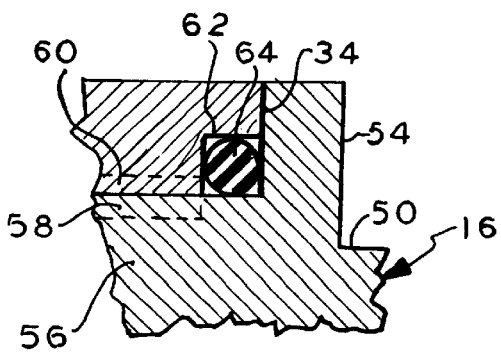
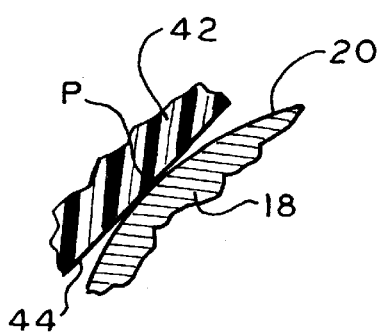

FLUID COUPLING DEVICE

This application is a continuation of application Ser. No. 09/718,273 filed Nov. 22, 2000 and incorporates all of the subject matter of that application in its entirety herein.

This invention relates to fluid ball and socket couplings for connecting high pressure fluid hoses or for connecting a fluid supply high pressure hose to a spray nozzle.

U.S. Pat. No. 1,087,006 discloses a spray nozzle coupled to a hose with a ball and socket coupling comprising a metal ball connected in a metal socket that is spun about the ball to retain the socket on the ball. This arrangement is subject to leakage.

U.S. Pat. No. 2,557,106 discloses a similar device which suffers from a similar deficiency.

U.S. Pat. No. 2,971,701 discloses a ball and socket arrangement employing an O-ring in combination with a split ring. A coupling nut engages the ball. The split ring permits universal pivoting of the ball. In a further embodiment resilient fingers engage the ball to bias the ball toward the split ring. In other embodiments a spring biases the ball.

In U.S. Pat. No. 3,022,014 a ball and socket arrangement is shown for a shower head. The ball is seated at one region against a packing and at another region is retained by a nut that has a shoulder that engages the ball.

U.S. Pat. No. 3,224,793 shows a ball and socket arrangement wherein an O-ring is used in combination with a split ring, the ring for retaining the ball in the socket.

In U.S. Pat. No. 3,334,818 to Moen, a swivel and socket arrangement is shown in which an adapter is threaded to a mounting member forming a socket. An O-ring seals against the swivel and against the adapter and mounting member. The adapter squeezes against the O-ring. An undescribed member also abuts the ball distal the adapter apparently for retaining the swivel in the socket in one axial direction. It appears that the O-ring holds the swivel axially in place so the swivel will not displace toward the adapter away from the retaining member in the opposite axial direction. This function, however, is not expressly described per se. The end of the swivel, which is ball shaped, adjacent to the adapter, is spaced from the adapter. It thus appears that the O-ring is both a seal and a retainer member.

In U.S. Pat. No. 3,921,912 a spherical member and gudgeon arrangement for a lawn sprinkler is disclosed. An O-ring abuts the member in the socket of the gudgeon and the spherical member also abuts the socket of the gudgeon directly.

Metal to metal contact in certain of the above patent devices is undesirable as it causes galling. Galling creates metal chips which can harm the O-rings which are typically rubber and thus cause leakage. In others of the above patents, the O-ring serves as both a sealing member and a retaining member. Since O-rings are typically made of rubber or other elastomeric material, high pressure between the O-ring and the mating members creates relatively high friction. This friction interferes with the operation of such devices. In some cases, it is known that silicon grease may be used on the O-rings to reduce friction. However, eventually such grease dissipates, especially in the presence of hot fluids, and the high friction returns.

The present invention is directed to provide a solution to the above problems.

A fluid coupling device according to one aspect of the present invention comprises a male member with an outer spherical surface and a fluid receiving bore passing through the member in communication with opposing first and second ends. A housing has a circular cylindrical chamber defining a longitudinal axis and is of a first transverse dimension, the chamber being open at third and fourth opposite housing ends, the fourth end having a reduced transverse dimension opening, at least a portion of the male member spherical surface being received in the chamber, the reduced dimension fourth end for retaining the male member in the chamber in a first direction along the axis. A nipple member includes a nipple at a first nipple member end and a coupling member at a second nipple member end, the nipple for receiving and coupling a fluid source to the male member fluid receiving bore in the chamber, the coupling member and housing being arranged for axially attaching the nipple member to the housing at the circular cylindrical chamber for retaining the male member in the chamber in a second direction opposite the first direction.

First and second annular seat members have an outer peripheral surface and a radially inward surface, the seat members being located in the cylindrical chamber in spaced axial aligned relation along the axis and abutting the housing in the chamber on their outer peripheral surface, the seat members abutting the spherical surface on their radially inward surfaces and dimensioned for receiving equal and opposite axial forces from and to the spherical surface, the seat members exhibiting negligible friction on their surfaces abutting the spherical surface.

A seal is in the chamber for fluid sealing the chamber between the housing and male member and between the housing and nipple member and for transferring an axial locking load to the first and second seat members, and to the male member from the nipple member.

In one aspect, the seat members comprise polytetrafluoroethylene at their radially inward surfaces.

Preferably the seal is an O-ring.

In a further aspect, the radially inward surfaces of the seat members each have inner inclined planar surfaces relative to the longitudinal axis.

In a further aspect, the seat members are identical.

In a further aspect, the coupling member includes an externally threaded member for engaging mating housing internal threads in the chamber, the threaded member having an end surface sealingly engaging the seal.

In a further aspect, the housing has an annular recessed shoulder at the chamber including a further seal sealingly engaging the recessed shoulder and the coupling member.

In a still further aspect, a fluid coupling device comprises a male member with an outer spherical surface of a given diameter and a fluid receiving bore passing through the member, the male member having opposing first and second ends. A housing has a circular cylindrical chamber of a first transverse dimension defining a longitudinal axis, the chamber being open at third and fourth housing ends on the axis, the fourth end having a reduced transverse dimension opening, at least a portion of the male member spherical surface being received in the chamber, the reduced dimension fourth end being smaller than the spherical surface diameter.

A nipple member includes a nipple and a coupling member at opposite ends, the nipple for receiving and coupling a fluid source to the male member fluid receiving bore, the coupling member and housing being arranged to secure the nipple member to the housing to retain the male member in the chamber at the third end. First and second annular seat members have an outer peripheral surface and a radially inward surface, the seat members being located in the cylindrical chamber in spaced axial aligned relation along the axis and abutting the housing in the chamber on their outer peripheral surface, the seat members abutting the spherical surface on their radially inward surfaces and dimensioned for receiving equal and opposite axial forces from and to the spherical surface, the seat members exhibiting negligible friction on their surfaces abutting the spherical surface.

An O-ring is in the chamber between the housing and male member and between the housing and nipple member for transferring an axial locking load to the first and second seat members, and to the male member from the nipple member.

In a further aspect, the seat members engage the spherical surface in an annular line contact.

In a further aspect, the regions of the seat member surfaces and the engaged spherical surface define different configurations.

IN THE DRAWINGS

FIG. 1 is a sectional elevation view of a ball and socket coupling arrangement according to an embodiment of the present invention;

FIG. 2 is a more detailed sectional elevation view of a portion of FIG. 1;

FIG. 2a is a more detailed view of the region 2 in FIG. 2;

FIG. 3 is a side elevation fragmented sectional view of a representative seat used in the embodiment of FIG. 1; and FIG. 4 is a fragmented portion of the device of FIG. 1 taken at region 4.

In FIG. 1 coupling device 10 comprises a male member 12 and a female housing 14. A nipple member 16 is connected to the housing 14. The male member 12 includes a ball portion 18 having a spherical surface 20. A tubular member 22 extends from the portion 18 and is one piece integral therewith. All of the elements above are steel and preferably stainless steel. The male member 12 has a bore 24 and has an axis 26. The tubular member 22 may be coupled to a flexible hose or to a spray gun via a mating coupling 28 (shown in phantom). The member 12 has an end 30 at the bore 24.

The housing 14, FIG. 2, is preferably circular cylindrical with a circular cylindrical chamber 32. The housing 14 has one end 34 that is open to the chamber (FIG. 1). The housing 14 has a second end 36 with a radially inwardly extending flange 38 that has a reduced diameter as compared to the opening at end 34. Flange 38 is smaller than the diameter of the spherical surface 20 of the ball portion 18. The chamber 32 has a diameter that is larger than the diameter of the ball portion 18 spherical surface 20 so that the surface 20 is spaced from the inner surface of the housing in the chamber 32 forming gap 40. The spherical surface 20 does not contact the housing at any point thereof so that there is no metal-to-metal contact therebetween. This prevents possible galling that may eventually occur between two metal surfaces that contact each other and move relative to each other. Such galling would produce undesirable metal chips or fragments that could otherwise deteriorate the seals of the device to be described below.

Located in the chamber 32 are two preferably identical Teflon (polytetrafluoroethylene) ring seats 42. As known, this material is commercially available and exhibits very low negligible friction. Representative seat 42, FIG. 3 has an inclined planar inner bearing surface 44. This surface engages the outer spherical surface 20 of the male member 12. The inclined surface 44 is flat and thus makes point contact with surface 20, FIG. 2a, at tangential point P. This produces an annular line contact between each of the seats 42 and the spherical surface 20, minimizing friction therebetween. While the seats are preferably solid Teflon, they may also be fabricated of other material and provided with a Teflon coating forming the bearing surfaces 44 engaging the spherical surface 20. Other materials of low negligible friction may be used in the alternative.

The two seats 42 make line contact with the surface 20 at the ends of chord 46, FIG. 2, of the spherical surface 20. Chord 46 is parallel to the chamber 32 axis 26' which is coaxial with axis 26. The two inclined surfaces 44 of the two seats 42 face in opposing directions and provide low friction contact with the spherical surface in two opposing directions. Thus the seats 42 apply axial thrust forces of equal magnitude to the surface 20 in opposite axial directions retaining the spherical ball portion 18 in the axial direction, axes 26, 26' in response to fluid forces on the male member 12. The surface 20 rotates with a minimum of friction and no galling.

An O-ring 48, rubber, plastic or elastomeric material is in the chamber 52 abutting the housing 14 inner chamber wall, the spherical surface of portion 18 of the male member, and the next adjacent ring seat 42, FIG. 2. The O-ring 48 seals the interface between the housing and the spherical surface 20 of the ball portion 18 and applies an axial locking force on these components.

Nipple member 16 has a serrated nipple 50, FIG. 1, for insertion into the bore of a flexible hose 52. The member 16 has a bore 51 and an enlarged circular cylindrical flange 54 and a cylindrical end member 56 of larger diameter than the nipple 50 at one end of the member 16. The end member 56 has external threads 58, FIG. 4, that engage internal threads 60 of the housing 14. The housing 14 has a corner recess 62. An O-ring 64 is in the recess 62. Flange 54 of the nipple member 16 abuts the end 34 of the housing and the O-ring 64 fluid sealing the interface between the nipple member 16 and housing 14. The abutment of the flange 54 with the housing end 34 limits the amount that the O-ring 48 is deformed by the member 16. This deformation is enough to provide a good seal between the O-ring and the housing and surface 20 without exerting excessive friction load on the spherical surface to maximize life of the O-ring. The primary force loads of the portion 18 on the housing are borne by the ring seats 42. The O-ring 48 does absorb some axial loads from the abutting seat 42 but these loads have no significant effect on the low friction between the seat and the surface 20. The end surface of the nipple member 16 end member 56 is concave and does not contact the spherical surface 20.

It will occur to one of ordinary skill that modifications may be made to the disclosed embodiments without departing from the scope of the invention as defined in the appended claims. The disclosed embodiments are given by way of illustration and not limitation.

What is claimed is:

1. A fluid coupling device comprising:
   a male member with an outer spherical surface and a fluid receiving bore passing through the member in communication with opposing first and second ends;
   a housing having a circular cylindrical chamber defining a longitudinal axis and of a first transverse dimension, the chamber being open at third and fourth opposite housing ends, the fourth end having a reduced transverse dimension opening, at least a portion of the male member spherical surface being received in said chamber, said reduced dimension fourth end for retaining the male member in the chamber in a first direction along the axis;

a nipple member including a nipple at a first nipple member end and a coupling member at a second nipple member end, the nipple for receiving and coupling a fluid source to said male member fluid receiving bore in the chamber, the coupling member and housing being arranged for axially attaching the nipple member to the housing at the circular cylindrical chamber for retaining the male member in the chamber in a second direction opposite the first direction;

first and second annular seat members having an outer peripheral surface and a radially inward surface, the seat members being located in the cylindrical chamber in spaced axial aligned relation along the axis and abutting the housing in the chamber on their outer peripheral surface, the seat members abutting the spherical surface on their radially inward surfaces and dimensioned for receiving equal and opposite axial forces from and to the spherical surface, the seat members exhibiting negligible friction on their surfaces abutting the spherical surface; and a seal in the chamber for fluid sealing the chamber between the housing and male member and between the housing and nipple member and for transferring an axial locking load to the first and second seat members, and to said male member from the nipple member.

2. The device of claim 1 wherein the seat members comprise polytetrafluoroethylene at their radially inward surfaces.

3. The device of claim 1 wherein the seal is an O-ring.

4. The device of claim 3 wherein the radially inward surfaces of the seat members each have inner inclined planar surfaces relative to said longitudinal axis.

5. The device of claim 1 wherein the seat members are identical.

6. The device of claim 1 wherein the coupling member includes an externally threaded member for engaging mating housing internal threads in the chamber, the threaded member having an end surface sealingly engaging the seal.

7. The device of claim 1 wherein the housing has an annular recessed shoulder at said chamber including a further seal sealingly engaging the recessed shoulder and the coupling member.

8. A fluid coupling device comprising:

a male member with an outer spherical surface of a given diameter and a fluid receiving bore passing through the member, the male member having opposing first and second ends;

a housing having a circular cylindrical chamber of a first transverse dimension defining a longitudinal axis, the chamber being open at third and fourth housing ends on said axis, the fourth end having a reduced transverse dimension opening, at least a portion of said male member spherical surface being received in said chamber, said reduced dimension fourth end being smaller than said spherical surface diameter;

a nipple member including a nipple and a coupling member at opposite ends, the nipple for receiving and coupling a fluid source to said male member fluid receiving bore, the coupling member and housing being arranged to secure the nipple member to the housing to retain the male member in the chamber at the third end;

first and second annular seat members having an outer peripheral surface and a radially inward surface, the seat members being located in the cylindrical chamber in spaced axial aligned relation along the axis and abutting the housing in the chamber on their outer peripheral surface, the seat members abutting the spherical surface on their radially inward surfaces and dimensioned for receiving equal and opposite axial forces from and to the spherical surface, the seat members exhibiting negligible friction on their surfaces abutting the spherical surface; and an O-ring in the chamber between the housing and male member and between the housing and nipple member for transferring an axial locking load to the first and second seat members, and to said male member from the nipple member.

9. The device of claim 8 wherein the seat members engage the spherical surface in an annular line contact.

10. The device of claim 9 wherein the regions of the seat member surfaces engaging the spherical surface define different configurations than the outer spherical surface of the male member.

* * * * *